UNITED STATES PATENT OFFICE.

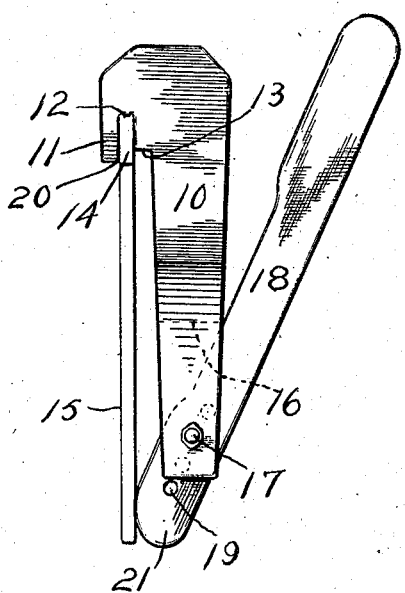
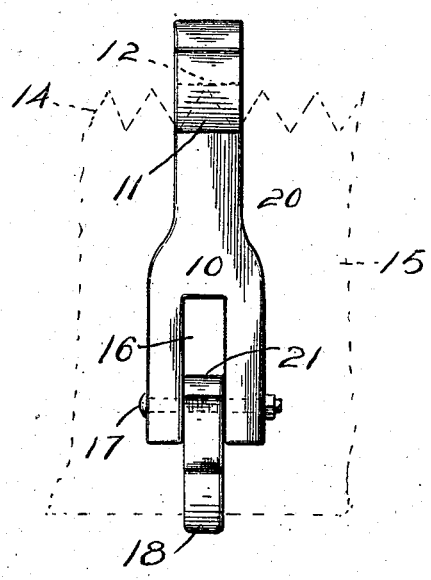
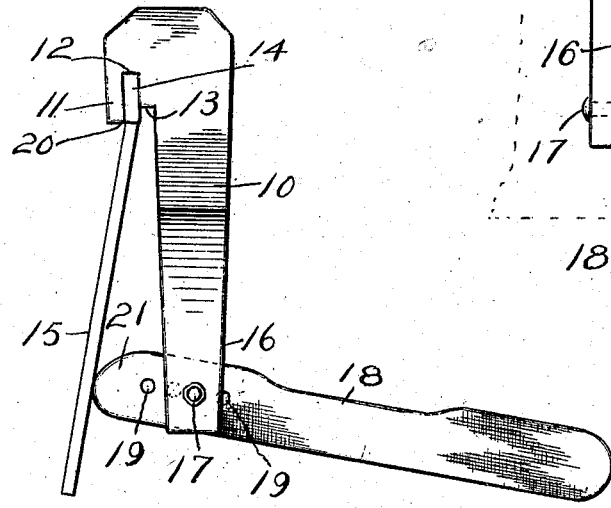

WALFRED W. OBERG, OF GEORGETOWN, MINNESOTA.

SAW-SET.

No. 921,150.     Specification of Letters Patent.     Patented May 11, 1909.

Application filed July 6, 1908. Serial No. 442,115.

*To all whom it may concern:*

Be it known that I, WALFRED W. OBERG, a citizen of the United States, residing at Georgetown, in the county of Clay, State of Minnesota, have invented certain new and useful Improvements in Saw-Sets; and I do hereby declare the following to be a full, clear, and exact description of the invention, such as will enable others skilled in the art to which it appertains to make and use the same.

This invention relates to devices for setting the teeth of saws, and has for one of its objects to simplify and improve the construction and increase the efficiency and utility of devices of this character.

Another object of the invention is to provide a simply constructed device of this character which may be manually operated and readily adjusted to set the teeth to a greater or lesser extent.

With these and other objects in view the invention consists in a stock portion having an overhanging lip near one end whereby a tooth receiving notch is formed, and a lever adjustably coupled to the stock at the opposite end and adapted to bear against the adjacent side of the saw blade and apply strain thereto to cause the setting of the tooth held within the notch.

The invention further consists in certain novel features of construction as hereafter shown and described and then specifically pointed out in the claims, and in the drawings illustrative of the preferred embodiment of the invention, Figure 1 is a side elevation of the improved device in its inoperative position. Fig. 2 is a side elevation with the improved device in operative position. Fig. 3 is a front elevation of the improved device with a section of a saw in position therein.

The improved implement comprises a stock portion 10 having an overhanging lip 11 at one end whereby an inwardly directed notch 12 is formed with a shoulder 13 within the notch, the recess adapted to receive one of the teeth 14 of the saw, a portion of the blade of which is represented at 15. The stock 10 is forked at the end opposite to the lip 11 as shown at 16 and with apertures through the forked portion to receive a bolt 17. Swinging upon the bolt 17 between the sides of the forked portion is a lever 18 having a plurality of apertures 19 whereby it may be adjusted longitudinally upon the bolt. By this simple arrangement the teeth of the saw may be set by inserting the teeth one at a time within the notch 12 and applying pressure to the surface of the blade next to the stock and bending the body of the blade against the point 20 of the overhanging lip, the extent of the bend being controlled by the position of the bolt in the holes 19 in the lever. Thus if a very slight "set" is required the bolt 17 will be located in the hole 19 nearest to the bearing end 21 of the lever, and if a greater "set" is required the lever is adjusted so as to project the greatest length of the short end of the lever beyond the stock. The notch 12, it will be obvious, should be of just sufficient width to receive the saw tooth, and then when the pressure is applied the point of the tooth will be held against the shoulder 13 while the root of the tooth bears against the corner 20 of the lip, and then when pressure is applied to the rear face of the saw, the bend of the tooth or the "set" will be accomplished.

In operating the device every alternate tooth will be set in one direction and then the implement reversed in position upon the saw and the remaining alternate teeth set in the opposite direction.

The implement is simple in construction, can be inexpensively manufactured, and will operate effectually for the purposes described.

What is claimed, is:—

1. An implement of the class described comprising a stock having an overhanging lip near one end whereby an inwardly directed tooth receiving recess is produced, and a lever swinging from the stock at its opposite end and adapted to impart pressure to the blade of the saw to bend the teeth against the overhanging lip.

2. An implement of the class described comprising a stock having a shoulder at one end and a lip overhanging the shoulder and extending below the same, whereby an inwardly directed saw tooth receiving recess is formed between the shoulder and the lip, and a lever swinging from the stock at its opposite end and adapted to impart pressure to the rear side of the saw and setting the teeth thereof against the overhanging lip.

3. An implement of the class described comprising a stock having an inwardly directed tooth receiving recess near one end, a pivot pin at the other end, and a lever having a plurality of spaced transverse apertures adapted to adjustably engage said pin whereby pressure is adapted to be applied to the rear face of the saw.

In testimony whereof, I affix my signature, in presence of two witnesses.

WALFRED W. OBERG.

Witnesses:
HERMAN STEIN,
J. E. STEWART.